United States Patent
Huang et al.

(10) Patent No.: US 6,583,964 B1
(45) Date of Patent: Jun. 24, 2003

(54) DISK DRIVE WITH MODE CANCELING ACTUATOR

(75) Inventors: Fu-Ying Huang, San Jose, CA (US); Wayne Isami Imaino, San Jose, CA (US); Jiann-Chang Lo, Cupertino, CA (US); Matthew T. White, Campbell, CA (US)

(73) Assignee: Hitachi Global Storage Technologies Netherlands B.V. (NL)

( * ) Notice: Subject to any disclaimer, the term of this patent is extended or adjusted under 35 U.S.C. 154(b) by 0 days.

(21) Appl. No.: 09/272,941

(22) Filed: Mar. 18, 1999

(51) Int. Cl.$^7$ .............................................. G11B 21/10
(52) U.S. Cl. ................. 360/294.4; 360/78.05
(58) Field of Search ........................ 360/264.5, 246.7, 360/75, 78.05, 78.12, 294.1, 294.3, 294.4

(56) References Cited

U.S. PATENT DOCUMENTS

| | | | |
|---|---|---|---|
| 4,967,293 A | * 10/1990 | Aruga et al. ............. | 360/78.12 |
| 5,062,012 A | * 10/1991 | Maeda et al. ............ | 360/75 |
| 5,189,578 A | * 2/1993 | Mori et al. ............... | 360/106 |
| 5,237,472 A | 8/1993 | Morehouse et al. ...... | 360/105 |
| 5,341,260 A | 8/1994 | Jabbari ..................... | 360/105 |
| 5,459,383 A | 10/1995 | Sidman et al. ........... | 318/611 |
| 5,548,653 A | * 8/1996 | Pla et al. .................. | 381/71.2 |
| 5,572,387 A | 11/1996 | Brooks, Jr. et al. ....... | 360/104 |
| 5,585,980 A | 12/1996 | Boutaghou ............... | 360/105 |
| 6,034,834 A | * 3/2000 | Yoshikawa et al. ....... | 360/75 |

OTHER PUBLICATIONS

Chiang, W. et al., *Piezoelectric modal sensor/actuator devices for DASD active damping Vibration control*, IBM Tech. Dis., 334(4B), pp. 53–54, 1991.

Kirtley, J. et al., *Active vibration damping of scanning tunneling microscope*, IBM Tech. Dis. 31(2), pp. 426–429, 1988.

Near, C., *Piezoelectric actuator technology*, Proc. SPIE–Int. Soc. Opt. Eng., vol. 2717, pp. 246–258, 1996.

Janocha, H. et al., *Principle of smart piezoactuators*, Actuator 986. 5$^{th}$ Int. Conference on New Actuators. Conf. Proceedings, pp. 148–151, 1996.

Zhi–Min, Y. et al., *Controller design criteria for the dual stage disk actuator system*, Proc. SPIE–Int. Soc. Opt. Eng., vol. 2101, No. 1, pp. 305–308, 1993.

Kobayashi, M. et al., *MR–46 Carriage acceleration Feedback multi–sensing controller for Sector servo systems*, Int. Conf. On Micromechtronics for Info. Prec. Equip., Tokyo, Jul. 20–23, 1997.

Guo, W. et al., *Dual stage actuators for high density rotating memory devices*, IEEE Trans. Magn, 34(2), pp. 450–455, 1998.

\* cited by examiner

*Primary Examiner*—Brian E. Miller
(74) *Attorney, Agent, or Firm*—Lumen Intellectual Property Services, Inc.

(57) ABSTRACT

A disk drive having an arm assembly equipped with a primary actuator such as a VCM and a mode-canceling actuator such as a PZT mounted at a location selected in such a way that the strain in the mode-canceling actuator is in phase with sway deformations of the primary actuator produced by the vibrational modes of the arm assembly. The primary actuator is driven to exert a primary force, $$\check{f}_{pm},$$

on the arm assembly while the secondary driver ensures that the mode-canceling actuator applies a mode-canceling force, $$\check{f}_{mc},$$

on arm assembly such that the gain and phase of one or more vibrational modes are canceled.

14 Claims, 6 Drawing Sheets

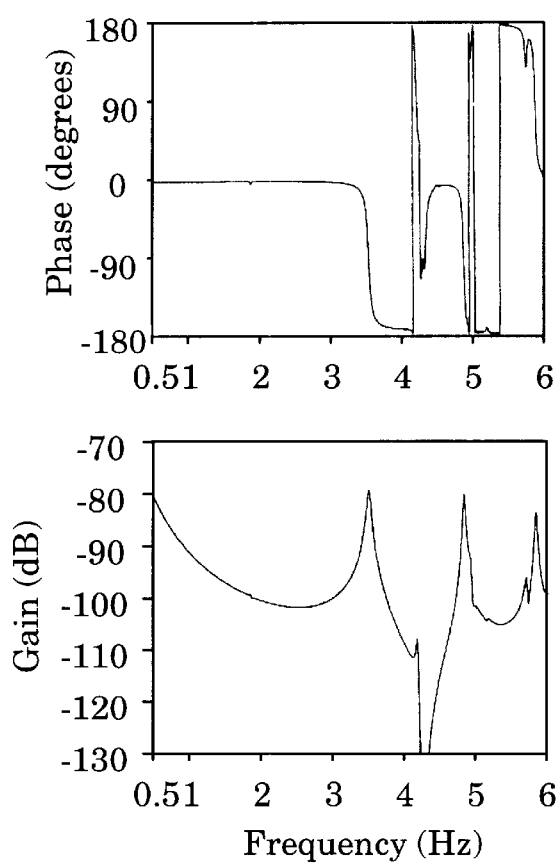 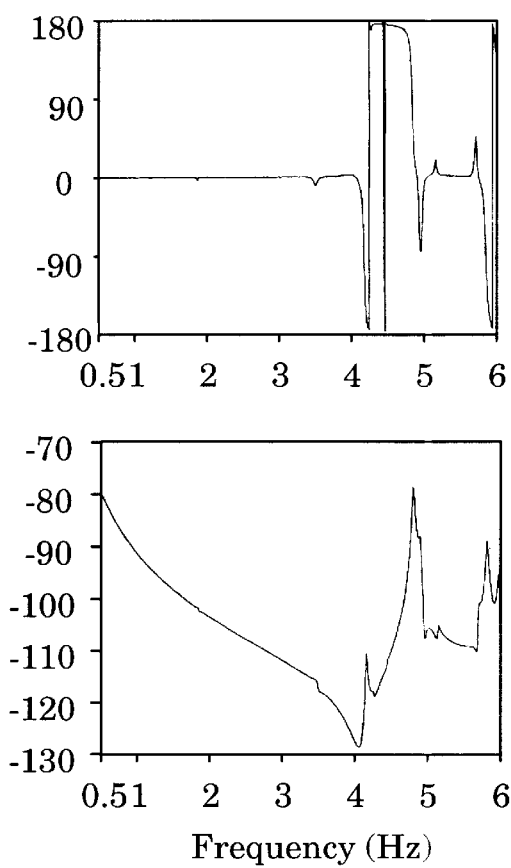
*FIG. 9A*        *FIG. 9B*

DISK DRIVE WITH MODE CANCELING ACTUATOR

FIELD OF THE INVENTION

This invention relates generally to mode canceling actuators used for canceling vibrational modes experienced by actuator-controlled arm assemblies employed in disk drives.

BACKGROUND OF THE INVENTION

Actuator-controlled arm assemblies employed in disk drives experience problems due to mechanical resonances. These resonances, or vibrational modes include the natural modes of the actuator system, e.g., a voice coil motor (VCM), and those of the arm assembly.

In a typical disk drive the arm assembly has a positioner arm equipped with a slider. The arm assembly is mounted about a pivot. The slider carries a transducer or read/write head and is located above the surface of a magnetic disk. The VCM is mounted opposite the slider and causes the arm assembly to rotate about the pivot as required to seek and track data on the disk. Specifically, the arm assembly moves the head to a desired data track in the disk and, once there, maintains the head's position over the track.

At high speeds and large track densities these seek and track operations are affected by the vibrational modes of the arm assembly and the actuator. Specifically, the vibrational modes limit the control loop gain of the actuator system, reduce the bandwidth of the actuator system, or both. This causes the head to experience excessive settling time after positioning, poor response to disturbances, poor tracking ability, or any combination of these.

General methods of achieving higher bandwidth include the use of high specific stiffness materials such as AlBC or Albemet for making the arms, employment of compound actuators and application of active and passive damping techniques.

The use of dual-stage actuation systems having a primary actuator, e.g., a VCM, for executing large movements and a secondary actuator, e.g., a piezoelectric element (PZT), for fine-tuning and tracking is well-known in the art. The small PZT milliactuator has higher vibrational modes than the VCM due to scaling. Descriptions of such systems are found in scientific and patent literature. Some representative references include Zhi-Min Y., et al. "Controller Design Criteria for the Dual-Stage Disk Actuator System", Proc. SPIE—International Society for Optical Engineering (USA), Vol. 2101, No. 1, 1993, pp. 305–8 and Guo, W., et al., "Dual Stage Actuators for High Density Rotating Memory Devices", IEEE Trans. Magn. (USA), Vol .34, No. 2, pt. 1 March 1998, pp. 450–5.

Prior art systems have also attempted to ensure stable operation of actuator systems by stabilizing the control loop. This has been done by inserting gain stabilizing filters such as electronic notch filters in the control loop path. These filters are placed in the downstream portion of the control loop to filter out the signal information within the band reject frequency range of the notch and thus help minimize excitation of these vibrational modes.

Filtering techniques of this type have several drawbacks. First, rather than compensating the vibrations of the actuated arm assembly directly they rely on correcting the driving signals sent to the actuator to achieve compensation. Second, these techniques depend on the ability of the designer to accurately predict the frequency of the vibrational modes. This becomes increasingly more difficult when operating in high accuracy regimes. Third, compensation of the gain loop is not capable of eliminating the amplitude and phase effects of the vibrational mode, i.e., the effects of the mode can not be completely canceled.

Another technique for damping vibrational modes of a servo control system was presented by Masahito Kobayashi et al. in "MR-46 Carriage Acceleration Feedback Multi-Sensing Controller for Sector Servo Systems," at the International Conference on Micromechtronics for Information and Precision Equipment, Tokyo, Jul. 20–23, 1997. This proposed multi-sensing control system uses accelerometers to generate acceleration feedback. An acceleration feedback controller receives the feedback signals and compensates the servo to damp the mechanical resonance modes.

Although Kobayashi's technique has been demonstrated, it can not be efficiently implemented without the use of notch filters. Furthermore, designing the feedback controller requires the designer to model the very complicated transfer function $H_d(s)$ of the servo-controlled system. This is computationally challenging and requires a considerable amount of processing time. Also, since the poles and zeros of the compensator used in the feedback controller can not be predetermined, it is not possible to guarantee the existence of a stable compensator. Most importantly, however, Kobayashi's technique does not achieve cancellation of the vibrational mode.

The prior art also teaches gain stabilization through low-pass filtering in the control loop. According to this method the components of the control signal having the resonance frequency are effectively prevented from exciting the vibrational modes of the actuator structure. This helps ensure system stability, but it also increases the phase shift at frequencies in the vicinity of the servo loop's unity gain crossing, thereby reducing the bandwidth of the servo system.

In U.S. Pat. No. 5,459,383 Sidman et al. teach a feedback loop using a motion sensor located in the servo system at or near the point of control. The sensor is referred to as "collocated" because it is at or near the point of control. During operation the sensor detects both the rigid body motion and deformation of the actuator. The signal component from the rigid body motion is always much larger than that due to deformation. The "collocated" feedback loop operates in conjunction with the ordinary feedback loop and has the effect of making the servo system perform as if the mechanical structure of the system had a much higher mechanical damping than it actually possesses.

Although Sidman's system does improve positioning control it relies on gain compensation and does not actually cancel any vibrational modes. Furthermore, the signal derived from the sensor includes the large rigid body component, which is also processed by the feedback loop and affects undesirably the rigid body motion properties of the actuator.

The above-mentioned problems have prevented the development of a servo system capable of entirely eliminating the effects of vibrational modes, including modes at the lowest frequencies which severely limit the bandwidth of the servo system. Moreover, the solutions relying on control signal compensation or passive damping introduce considerable complications into the control loop.

A high-performance disk drive should have, in addition to the ability to cancel at least one vibrational mode, e.g., the butterfly mode, a low-mass arm assembly and its rigid body motion should remain unaffected.

OBJECTS AND ADVANTAGES OF THE INVENTION

Accordingly, it is a primary object of the present invention to provide a vibrational mode canceling mechanism for stabilizing a servo-controlled actuator system and overcome the disadvantages of the prior art. Specifically, the control mechanism of the invention is designed to cancel the amplitude and phase effects of at least one vibrational mode while minimizing the mass of the arm assembly and preserving its rigid body motion characteristics.

It is another object of the invention to provide for mode cancellation of major modes including the butterfly mode. Still another object of the invention is to achieve mode cancellation with a low-cost and low-mass element, and to thus permit one to design efficient devices with a higher number of tracks per inch (TPI). In particular, it is an object of the invention to employ a mode-canceling actuator such as a piezoelectric (PZT) element.

The above objects and advantages, as well as numerous improvements attained by the system and method of the invention are pointed out below.

SUMMARY

These objects and advantages are attained in a disk drive in which an arm assembly is equipped with a primary actuator and a mode-canceling actuator. The primary actuator, preferably a voice coil motor (VCM), is mounted on the assembly at a first location while the mode-canceling actuator, preferably a piezoelectric (PZT) actuator, is mounted at a second location. The second location is selected in such a way that the strain in the mode-canceling actuator is in phase with sway deformations of the primary actuator produced by the vibrational modes. Specifically, the strain experienced by the mode-canceling actuator has to be in phase with sway deformations in the plane of the arm assembly caused by the major modes. A primary driver is provided to control the primary actuator such that it exerts a primary force, $$\check{f}_{pm},$$

on the arm assembly. Meanwhile, a secondary driver ensures that the mode-canceling actuator applies a mode-canceling force, $$\check{f}_{mc},$$

to the arm assembly such that one or more vibrational modes, e.g., the lowest frequency modes, are canceled.

The primary and secondary drives are conveniently controlled by a control circuit or device which sets the ratio r of the primary force, $$\check{f}_{pm},$$

to the mode-canceling force, $$\check{f}_{mc}$$

at a certain value. Specifically, the value of ratio r and the location of the mode-canceling actuator are set such that none of the vibrational modes produced by the mode-canceling force exceeds any of the corresponding vibrational modes caused by the primary actuator by more than 6 dB.

Preferably, the mode-canceling actuator eliminates at least the butterfly mode. In some disk drives, elimination of one or more major modes other than the Butterfly mode is also desirable.

DESCRIPTION OF THE FIGURES

FIG. 9A includes two graphs showing the phase and gain of the Sailfin drive arm assembly without a mode-canceling actuator.

FIG. 9B includes two graphs showing separately the phase and gain of the Sailfin drive arm assembly with a mode-canceling actuator according to the invention.

DETAILED DESCRIPTION

Figure 1:
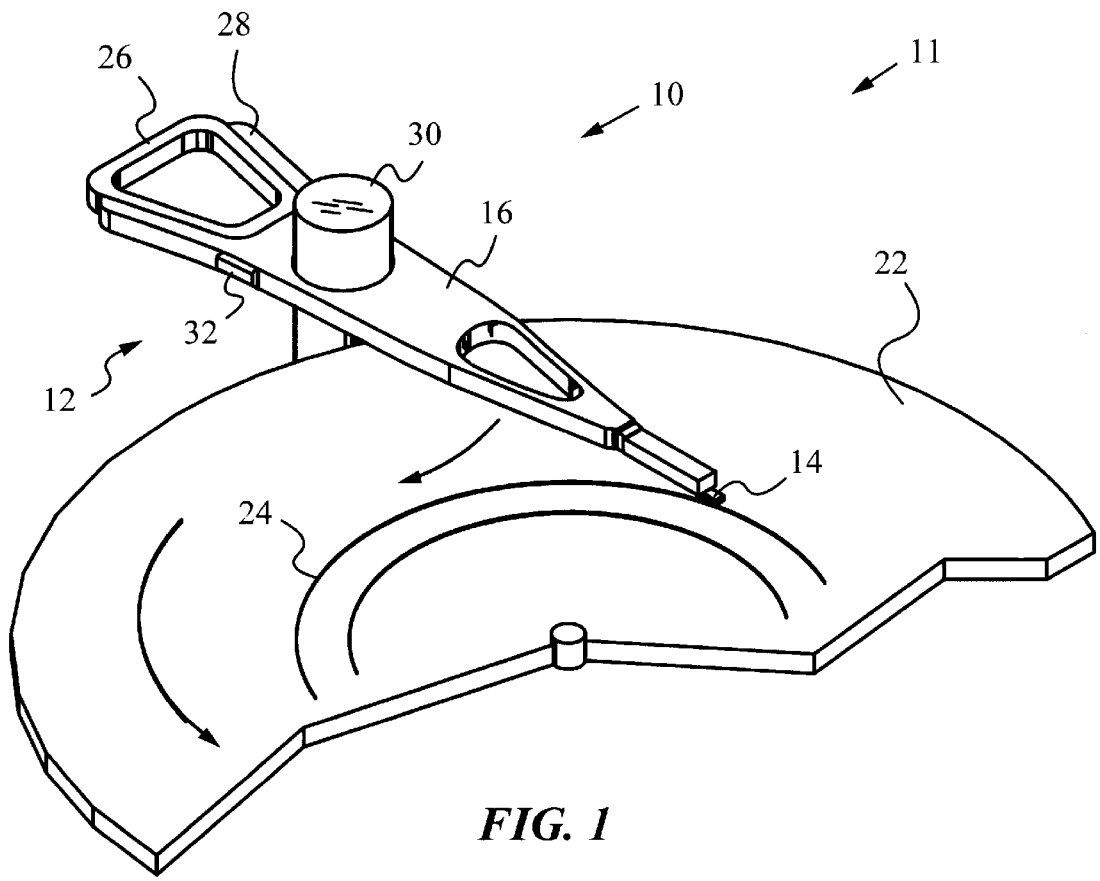
FIG. 1 is an isometric view of a disk drive according to the invention.

FIG. 1 illustrates a servo-controlled actuator system 10 deployed in a hard disk drive 11. Actuator system 10 has an arm assembly 12 equipped with a transducer or controlled element 14, in this case a read/write head. Arm assembly 12 has a positioner arm 16. Entire assembly 12 is mounted on a pivot or hub 30. Head 14 is positioned above a disk 22 with concentric data tracks 24 and accesses various tracks 24 during operation by pivoting or rotating around hub 30. This general construction of arm assembly 12 is well-known in the art of hard disk drives.

A primary actuator 26, in this instance a voice coil motor (VCM), is mounted in a cradle or coil support 28 opposite head 14. VCM 26 moves arm assembly 12 by causing it to rotate about hub 30. Consequently, actuator 26 is also known as a rotary actuator. The amount of rotation is controlled by a primary drive signal 50 (see FIG. 3) in the form of a current passed through coil 26.

Figure 2:
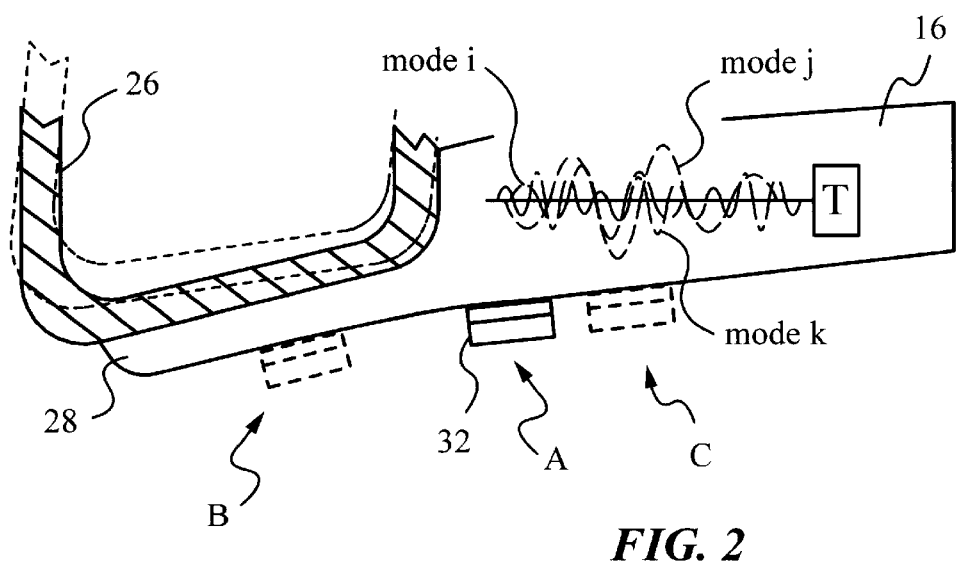
FIG. 2 is a plan schematic view of a portion of the arm assembly of the disk drive shown in FIG. 1.

As better illustrated in the partial view of FIG. 2, a mode-canceling actuator 32 is attached to arm assembly 12 near cradle 28. It is preferable that mode-canceling actuator be a light-weight device, e.g., a piezoelectric element (PZT). The use of a heavy mode-canceling actuator, e.g., a device weighing as much as or more than VCM 26 should be avoided, because it would affect the rigid body motion of arm assembly 12. Also, a heavy mode-canceling actuator will undesirably increase the inertia of arm assembly 12. Specifically, the weight of PZT 32 is typically about 1 mg. In comparison, the weight of VCM 26 usually ranges from 4–6 grams.

The exact position of PZT 32 is selected such that it is sensitive to the in-plane sway deformations experienced by VCM 26. Referring back to FIG. 2, the dashed lines indicate the in-pane sway deformation of VCM 26 resulting from the vibrations of arm assembly 12. When arm assembly 12 experiences vibrational modes during operation, PZT 32 experiences strains resulting from these modes. This is because the in-plane sway deformations of VCM 26 translate into deformations of cradle 28.

In most instances an empirical approach can be used to obtain a transfer function, T, describing the vibrational modes of arm assembly 12. For purposes of illustration, the graphs of FIG. 9A show the transfer function T for a typical arm assembly used in a Sailfin type disk drive. The graphs show the gain and phase effects of the vibrational modes separately. The Sailfin drive has ten separate arm assemblies. The most prominent vibrational modes are the "butterfly mode" centered at about 3,500 Hz, the S mode located at about 4,200 Hz, the end-arm mode at about 4,800 Hz and the second butterfly mode at about 5,800 Hz. The gain of the "butterfly mode" is chiefly responsible for the limited operation bandwidth of a typical arm assembly. It is therefore crucial to cancel both the gain (amplitude) and the phase of these major vibrational modes, or, at least of the butterfly mode.

As is true of any mechanical system, when arm assembly 12 vibrates, the vibration can be decomposed into several vibrational modes which have their own unique vibration shapes called "mode shapes". The mode shape $\bar{\phi}$ of the i-th mode can be expressed as:

$$\bar{\phi}_i = \bar{\phi}_i(x,y,z),$$

which is a function of location (x,y,z). The net in-plane sway deformation $\Delta_{in\text{-}plane}$ of coil 26 is then described by:

$$\Delta_{in\text{-}plane} = \int_{coil} \bar{\phi}_i(x, y, z) \cdot \bar{F}(x, y, z)\, dx\, dy\, dz,$$

where $\bar{F}$ is the force applied on coil 26. Thus, the strain, $\varepsilon_i$, experienced by PZT 32 due to the i-th vibrational mode is also a function of the mode shape $\bar{\phi}_i$ and is represented by:

$$\varepsilon_i = \varepsilon_i(\bar{\phi}_i).$$

When the sign of the sway deformation $\Delta_{in\text{-}plane}$ is the same as the sign of strain $\varepsilon_i$ at the location of PZT 32, then PZT 32 is properly mounted with respect to the i-th mode. In this position the strain experienced by PZT 32 is in phase with the i-th mode.

Proper placement of PZT 32 is visualized in FIG. 2. For the sake of simplicity, only three test positions A, B, and C of PZT 32 are shown. Also, although the transfer function T consists of a multiplicity of modes only three major modes are illustrated. These may correspond to the first butterfly mode and the first and second end arm modes and directly limit servo performance and bandwidth because of their high gains and phase shifts. The remaining modes are minor modes, which have low gain and phase shifts and thus lie outside the range of interest.

In each position, PZT 32 effectively partitions all vibrational modes into two groups; one group of modes is in phase with the strain in PZT 32 and the other is out of phase. The final position of sensor 32 has to be such that all major modes i, j and k are in phase with its strain. The phase relationship with minor and negligible modes is not important and these may all fall into the out of phase partition. In fact, minor modes generally remain stable due to original material damping.

The below table shows the phase relationship between strain experienced by PZT 32 and major modes i, j, and k with respect to sway deformation $\Delta_{in\text{-}plane}$ of VCM 26. At location A the strain in PZT 32 is in phase with modes i, j, and k. At location B the strain in PZT 32 is out of phase with modes i and j, and at location C it is out of phase with mode k. Hence, the proper final location for permanently mounting PZT 32 is A.

|  | Mode i | Mode j | Mode k | ... |
|---|---|---|---|---|
| sign of $\Delta_{in\text{-}plane}$ | + | − | + | ... |
| sign of $\varepsilon_i$ for PZT location A | + | − | + | ... |
| sign of $\varepsilon_i$ for PZT location B | − | + | + | ... |
| sign of $\varepsilon_i$ for PZT location C | + | − | − | ... |

Preferably, the ultimate position of PZT 32 is fine-tuned even more precisely. Specifically, the final position of PZT 32 is selected such that the gains of major modes excited by PZT 32 in its mode-canceling operation through application of mode-canceling force, $$\check{f}_{mc},$$

do not exceed a certain gain level. More specifically, the gain of any major mode excited by mode-canceling force, $$\check{f}_{mc},$$

has to be no more than 6 dB larger than the gain of that mode due to the primary force, $$\check{f}_{pm},$$

applied by VCM 26. Under this condition the phase of the major mode affected will change, but it will be guaranteed that the gain will not be bigger than the original gain.

In practice, the proper final position for PZT 32 can be found by empirical or analytic methods such as computer-implemented algorithms. When the mechanical structure of arm assembly 12 is specially designed, e.g., when arm assembly 12 belongs to a rotary actuator system used in hard disk drives, the general vicinity of the potential final position is easier to predict and hence the empirical approach is viable. For example, in the IBM Sailfin actuator the right side of the second to bottom arm is the proper general area to search for the final PZT position.

The analytical approach involves modeling arm assembly 12. This is done, for example, with the aid of finite element analysis software. The analysis pinpoints final position A on arm assembly 12, specifically on cradle 28, where sensor strain is in phase with the major modes. This is the position at which PZT 32 is permanently attached. A fine-fine tuning of this position may be required due to an additional requirement as described below.

Figure 3:
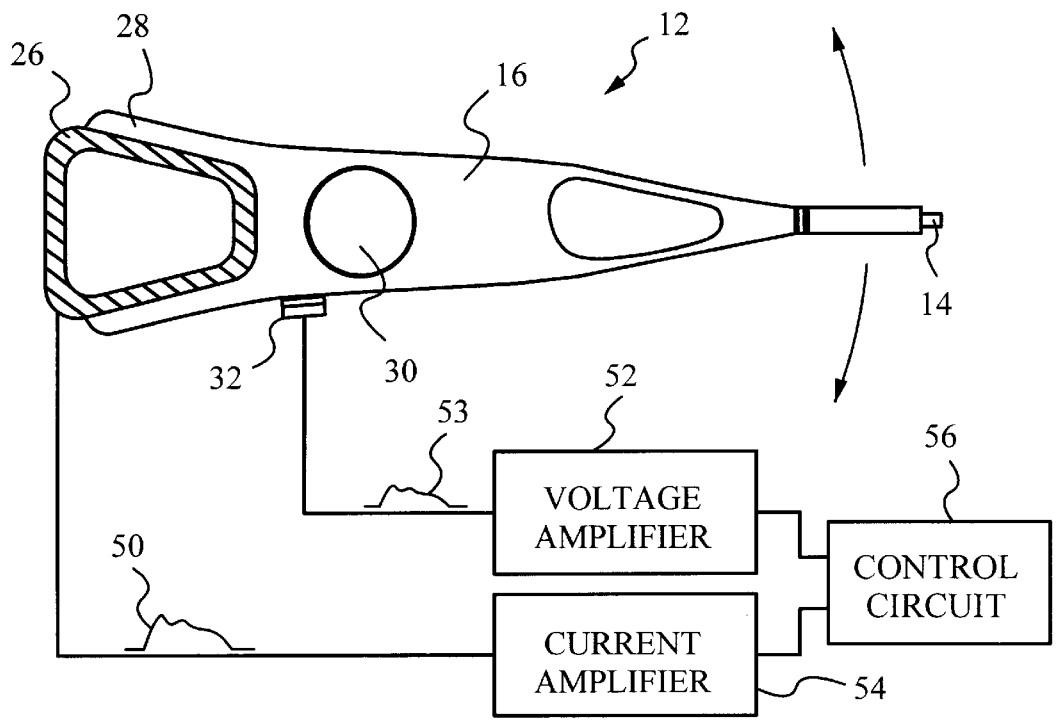
FIG. 3 is a plan schematic view illustrating the operation of the arm assembly of FIG. 1.

The schematic diagram of FIG. 3 shows the necessary control elements for operating arm assembly 12 of disk drive 11. VCM 26 is a current-driven device and is connected to a primary driver 54 which is a current amplifier. PZT 32 is a voltage-driven device and is connected to a secondary driver 52 which is a voltage amplifier 52. Both amplifiers 52, 54 are controlled by a control circuit 56.

During operation, control circuit 56 determines from the vibrational data of arm assembly 12 and the position of head 14 proper primary drive signal 50 or drive current for VCM 26. Specifically, drive current 50 has to be such that it causes VCM 26 to exert a primary force, $$\check{f}_{pm},$$

on arm assembly 12. At the same time, the mode-canceling drive signal 53 or voltage delivered by amplifier 52 has to be such as to cause PZT 32 to apply a mode-canceling force, $$\check{f}_{mc},$$

to assembly 12 such as to cancel out the desired vibrational mode, e.g., the butterfly mode. Cancellation of the mode, or elimination of the gain and phase associated with the mode, will take place when the ratio r of primary force, $$\check{f}_{pm},$$

applied by VCM 26 to the mode-canceling force, $$\check{f}_{mc},$$

applied by PZT 32 is set and maintained at a specific value.

The calculation of ratio r is based on the transfer function T, which can be expressed as:

$$T = \frac{R_k \psi_i^k \psi_j^i f_i}{m_i(\lambda_i - \omega^2)}$$

where $\psi_i$, $m_i$, $\lambda_I$ are the displacement vector, mass, and eigenvalue of the i-th vibrational mode. The vector $R_k$ describes the measured point and $f_j$ are the components of the driving force vector. For economy of notation, the Einstein convention is used and thus the repeated indices are summed over. In vector notation, this equation can be rewritten as:

$$T = \frac{\left(\vec{\psi}^i \cdot \vec{R}\right)\left(\vec{\psi}^i \cdot \vec{f}\right)}{m_i(\lambda_i - \omega^2)}.$$

where it is convenient to remember this expression as the product of two inner products. To eliminate from the transfer function a major mode we produce a modified driving force, $f_k$, such that the inner product vanishes. In other words:

$$74 \;_k \psi_i^k = 0,$$

or in vector notation:

$$\vec{\psi}_k \cdot \vec{f} = 0.$$

Of course, this modified force must still obey the relation:

$$\vec{\psi}_0 \cdot \vec{f} \neq 0$$

where $\psi_0$ is the rigid body mode.

Referring now back to FIG. 3, mode cancellation of, e.g., the butterfly mode is achieved by the modified driving force $f_k$ which is composed of the primary force, $$\check{f}_{pm},$$

and the mode-canceling force, $$\check{f}_{mc}.$$

These two component forces are adjusted such that the ratio of the force applied by VCM 26 and PZT 32 on arm assembly 12 is given by:

$$\vec{\psi}_1 \cdot \left(\check{f}_{pm} + \check{f}_{mc}\right) = 0.$$

In this case major mode $\psi_1$ is the butterfly mode. Of course, any other major mode could be selected for cancellation or a number of modes could be canceled at the same time. For this purpose multiple mode-canceling actuators like PZT 32 can be used in concert.

The ratio of the primary and mode-canceling forces is computed by control circuit 56 using standard logic circuitry. After performing the computation circuit 56 appropriately adjusts the gain of amplifiers 54, 52 to apply the computed primary and mode-canceling forces via VCM 26 and PZT 32.

In the present embodiment circuit 56 bases its adjustments of amplifiers 54, 52 on the ratio r of primary force to mode-canceling force expressed as:

$$r = \frac{\left(\vec{\psi}_1 \cdot \check{f}_{pm}\right)/(gK_f)}{\left(\vec{\psi}_1 \cdot \check{f}_{mc}\right)/h}$$

where g is the voltage to current gain of current amplifier 54, $K_f$ is the torque constant of arm assembly 12 with actuators and any other devices, and h is the gain of voltage amplifier 52. In the case where circuit 56 produces output voltages to regulate amplifiers 52, 54, the ratio can be expressed in terms of driving voltages $V_{pm}$ and $V_{mc}$ as:

$$V_{mc} = \frac{V_{pm}}{r}.$$

Generally, for a particular design of arm assembly 12 and placement of PZT 32, this ratio r is well-defined and may be determined through simulation or experiment. Of course, if this ratio does not satisfy the above equation then this constitutes evidence that other modes are affecting assembly 12.

In addition to maintaining proper force ratio r the actual magnitudes of the primary and mode-canceling forces have to be controlled as well. Once again, this is done in order that the gains of major modes excited by PZT 32 in its mode-canceling operation do not exceed by more than 6 dB the gain levels caused by VCM 26. This is done by fine-tuning the location of mode-canceling actuator 32 while satisfying the above-explained in-phase condition.

Figure 7:
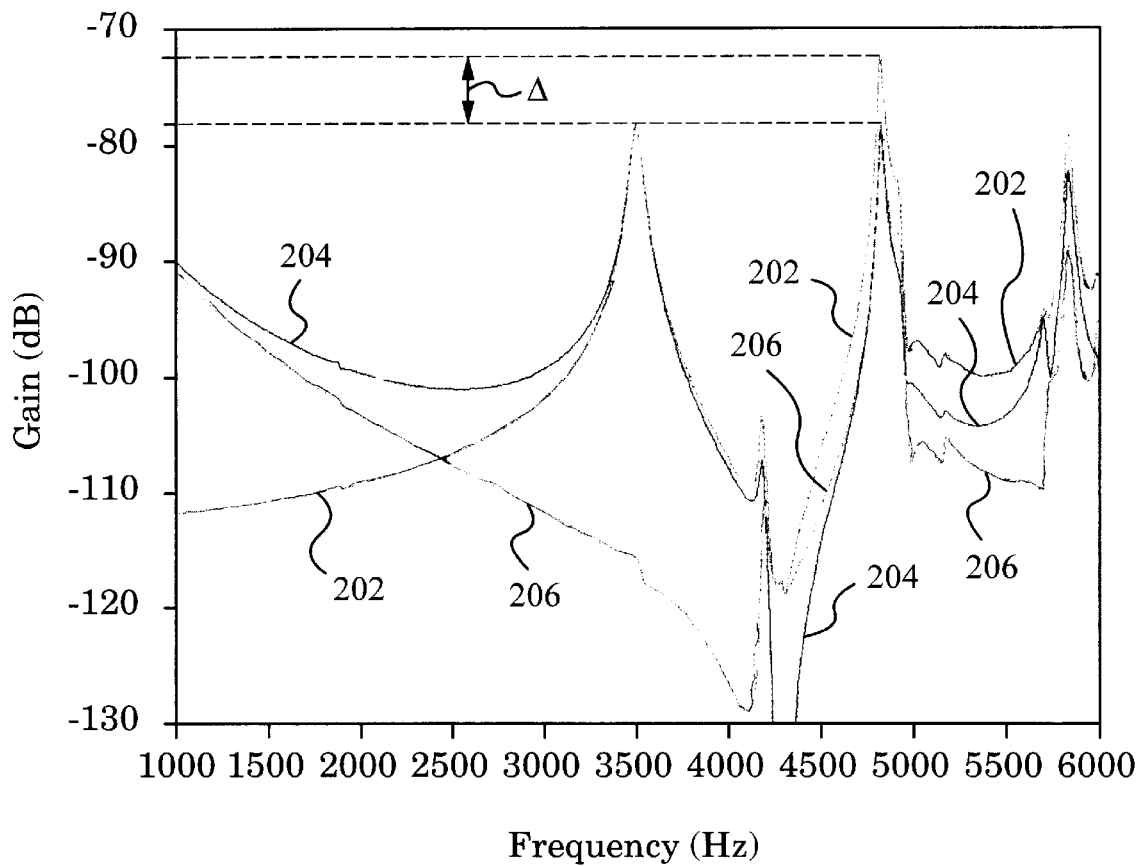
FIG. 7 is a graph illustrating the gain cancellation performance of the mode-canceling actuator mounted on the arm assembly of FIG. 6.
Figure 8:
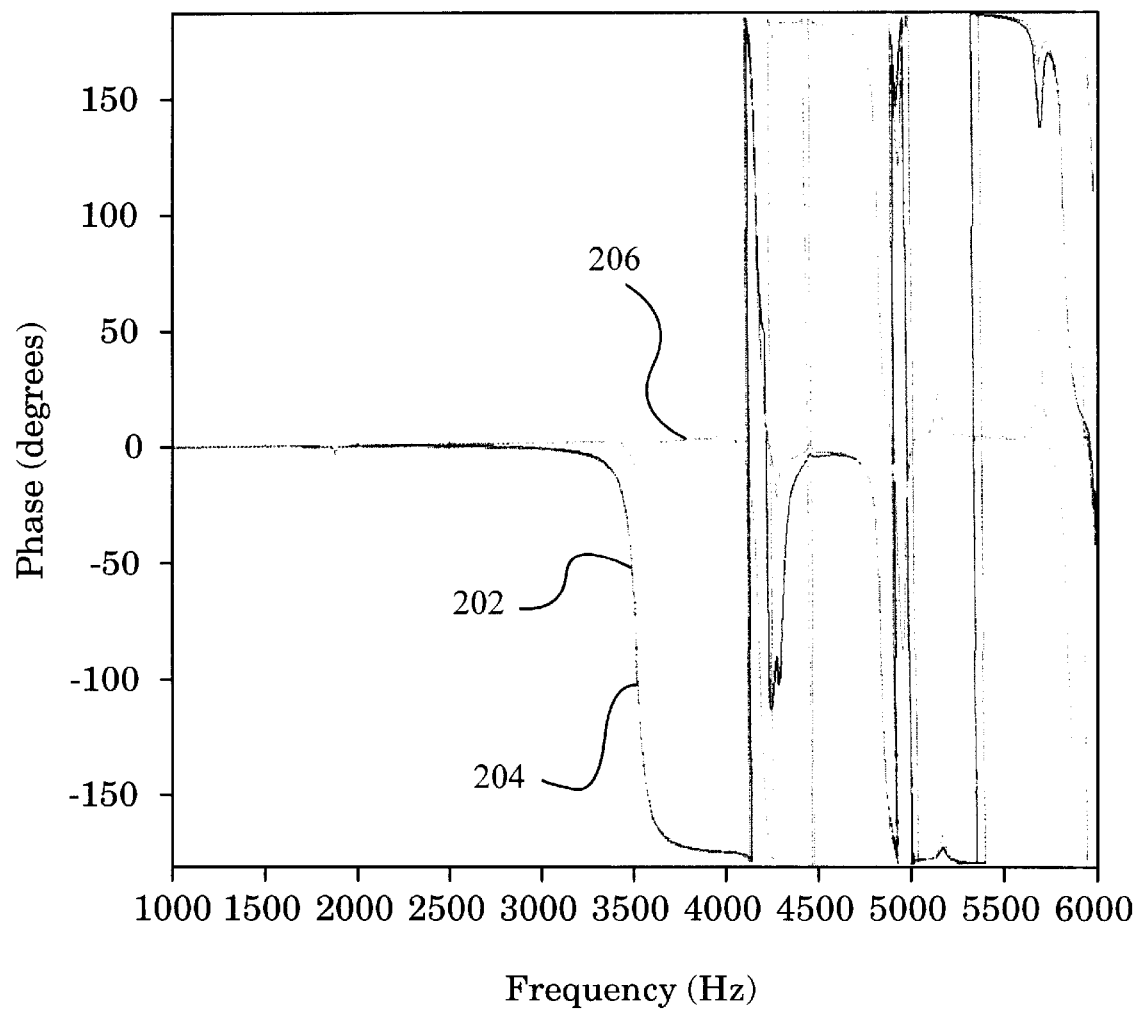
FIG. 8 is a graph illustrating the phase cancellation performance of the mode-canceling actuator mounted in the Sailfin drive.

The proper gain relationship is visualized in FIG. 7 where graph 202 indicates the result of mode-canceling force only and graph 204 indicates the result of primary force only for mode-cancellation according to the invention deployed in an IBM Sailfin drive. The gains of the end arm mode due to mode-canceling force are within a $\Delta \geqq 6$ dB of the end arm mode gains caused by the primary force. The result of both forces acting together is indicated by graph 206. Clearly, the butterfly mode is canceled under these circumstances and the remaining major modes are not aggravated. The phase effects are shown in the graphs of FIG. 8. The same reference numbers are used for the arm assembly's response to primary force only, mode-canceling force only, and both forces being applied together.

In a particular application of the invention, mode cancellation may be turned off while head 14 is seeking a new track 24. That is because higher voltages are usually required for seeking. During that time circuit 56 can be switched off and then resume operation once a particular track 24 is selected to be followed.

Figure 4:
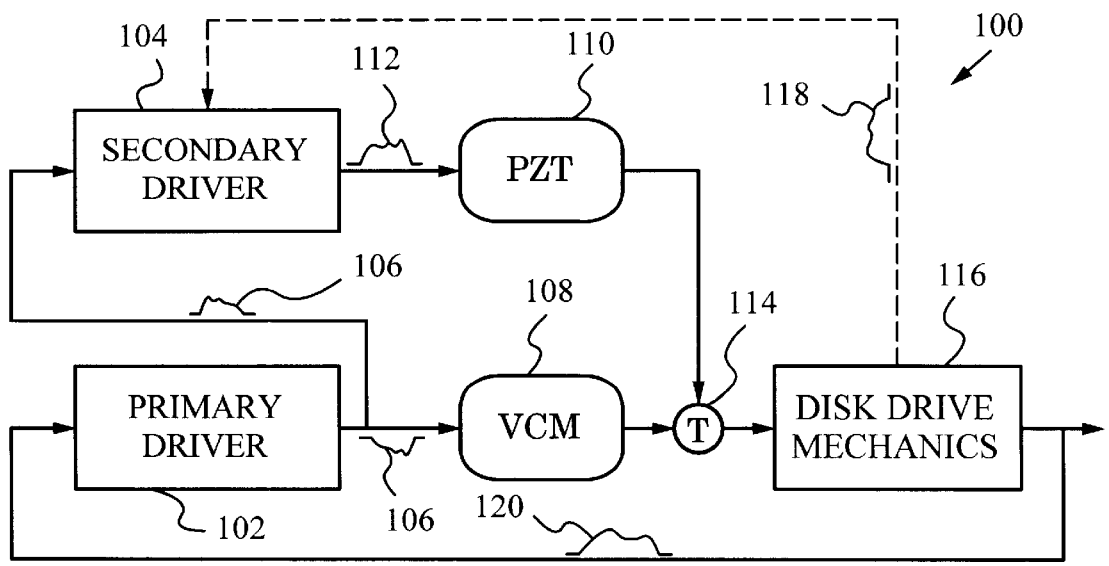
FIG. 4 is a block diagram showing a control loop for use in a disk drive with mode-cancellation according to the invention.

The above-described system uses an open-loop type control for driving VCM 26 and PZT 32. Open-loop control assumes a priori knowledge of the frequencies of the modes to be canceled. Small changes in ratio r due to temperature effects can be mitigated by adjusting or re-calibrating control circuit 56. However, in a high-performance system small and continuous variations in ratio r will adversely affect the efficiency of mode-cancellation. Hence, in a preferred implementation of mode-canceling a closed loop control system 100 is used as shown in the block diagram of FIG. 4.

Control system 100 is a general closed-loop system. A person of average skill in the art will appreciate that in practice this type of system may be modified to best cooperate with any given disk drive. System 100 has a primary driver 102 for driving a VCM 108 and a secondary driver 104 for driving a PZT 110. The logic of system 100 is contained in drivers 102, 104 rather than in a separate circuit. Secondary driver 104 is connected to the output of primary driver 102 to receive a primary drive signal 106 which is also delivered to VCM 108. Secondary driver 104 uses signal 106 in generating mode-canceling drive signal 112 delivered to PZT 110 to ensure the proper force ratio r, as described above.

In particular, the effects of VCM 108 and PZT 110 applying their respective forces on a schematically indicated arm assembly 114 are measured by disk drive mechanics 116. Preferably, mechanics 116 will simply include the read/write head which derives a position error signal (PES) 120 from pre-recorded servo information on the disk. PES 120 informs primary driver 102 by how much the read/write head has to be moved to be in the correct position over a selected data track. PES 120 can be further processed to derive a signal 118 indicating the vibrational response of assembly 114. Alternatively, PES 120 can be used directly as signal 118. In another embodiment, mechanics 116 may include transducers in addition to the read/write head, e.g., accelerometers. Such transducers are typically mounted close to the read/write head and are capable of delivering a measured signal 118 indicating the actual vibrational response of assembly 114. The read/write head can still deliver PES 120 as necessary. Mechanics 116 of this type are well-known in the art.

System 100 is wired to deliver signal 118 to secondary driver 104 and PES 120 to primary driver 102. (Alternatively, a head position signal derived from markings disposed on the disk can be used instead of PES 120.) Signal 118 is used to determine or at least estimate the performance of system 100 or the accuracy of the model. This determination is performed with the aid of known methods, such as adaptive control or on-line/real-time system identification. More detailed information about these methods for determining system performance is contained in the textbook *Adaptive Control*, 2nd edition, by Karl J. Astrom and Bjorn Wittenmark published by Addison-Wesley.

Signal 118 is used to adjust the parameters of secondary driver 104 and cause it to issue correspondingly adjusted mode-canceling signal 112. In accordance with known principles of control engineering, signal 118 may or may not be filtered, to adjust the parameters of secondary driver 104. The control techniques which can be applied fall into two broad categories. The first category includes techniques that adjust the parameters based on the performance of the system 100, such as direct adaptive control, learning control with fuzzy logic and/or neural networks, auto-tuning, and the like. The second category includes techniques that adjust the parameters based on the accuracy of the model, such as indirect adaptive control, on-line system identification, self-tuning, and the like. In essence, all of these techniques achieve the same objective by using signal 118 to directly or indirectly (adaptively) adjust the feedback control, i.e., to determine signal 112. This adjustment is performed on the time scale on the order of changes taking place in the disk drive system. For example, the adjustment time scale matches the time scale on which the torque constant $F_t$ or characteristics of PZT 110 vary. Thus, the adjustment ignores disturbances and noise, which typically have significantly shorter time scales, but takes into account known parameters which contribute to the variation of ratio r thus guaranteeing improved mode-canceling performance.

The mode-canceling system of the invention provides an effective mechanism for canceling the gain and phase of any given vibrational mode and stabilizing a servo-controlled actuator system. Furthermore, the mechanism of the invention minimizes the mass of the arm assembly and preserves its rigid body motion characteristics because of the low-weight of the PZT element. The low-cost of PZT elements further opens the possibility to design efficient and low-cost disk drives with a higher number of tracks per inch (TPI).

Figure 5:
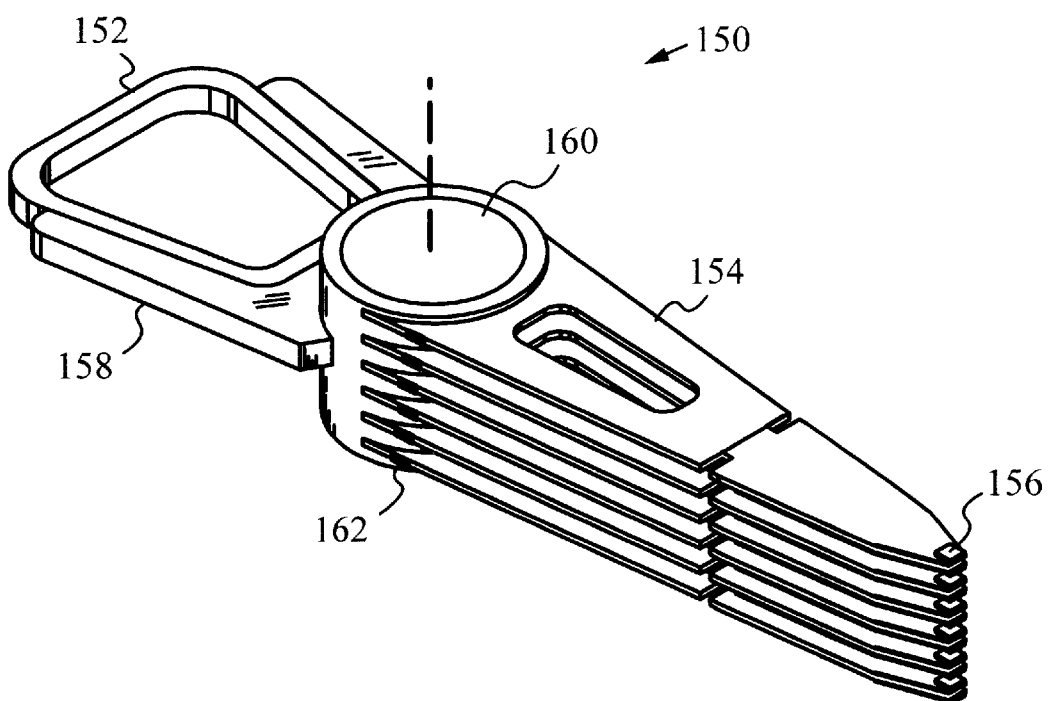
FIG. 5 is an isometric view of a multiple positioner arm assembly equipped with mode-canceling actuators according to the invention.

An adaptation of the mode-canceling system to a multiple positioner arm assembly 150 is shown in the isometric view of FIG. 5. In this embodiment a single primary actuator 152 in the form of a VCM lodged in a cradle 158 applies the primary force to assembly 150. Six positioner arms 154 equipped with read/write heads 156 are thus rotated about a hub 160. One mode-canceling actuator 162 in the form of a PZT element is mounted on each positioner arm 154. The position of each PZT 162 is selected according to the placement criteria discussed above. During mode-canceling operation each PZT 162 contributes a portion of the total mode-canceling force applied to assembly 150.

Figure 6:
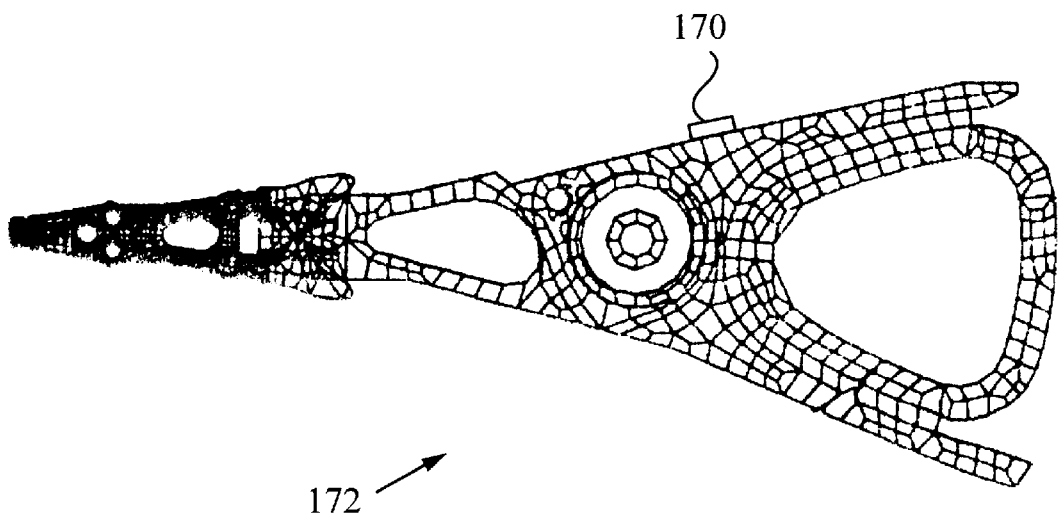
FIG. 6 is a top plan view of an arm of an IBM Sailfin drive equipped with a PZT mode-canceling actuator.

FIG. 6 illustrates in top plan view a mode-canceling PZT 170 mounted on a representative arm assembly 172 belonging to an IBM Sailfin drive. The mode-cancellation performance data in the graphs of FIGS. 7 and 8 are based on arm assembly 172 in which PZT 170 applies a mode-canceling force, as described above, to cancel the butterfly mode centered at about 3,500 Hz. Specifically, graph 206 in FIG. 7 illustrates the gain reduction for the butterfly mode achieved by applying the mode-canceling force with PZT 170. Corresponding graph 206 in FIG. 8 illustrates the phase cancellation achieved for the butterfly mode.

For a clearer evaluation, FIG. 9B shows the performance of the Sailfin drive using a PZT mode-canceling actuator for canceling the gain and phase of the butterfly mode in two separate graphs.

The top graph shows the phase response and the bottom graph the gain response. For comparison purposes, FIG. 9A shows the performance of the same drive without a mode-canceling actuator.

The system and method of the invention are simple and permit the user to achieve mode-canceling of any major mode affecting a disk drive. Of course, it will be clear to one skilled in the art that the above embodiment may be altered in many ways without departing from the scope of the invention. Accordingly, the scope of the invention should be determined by the following claims and their legal equivalents.

What is claimed is:

1. An actuator system deployed in a disk drive wherein said disk drive has a rigid arm assembly experiencing a plurality of vibrational modes including predetermined vibrational modes, said actuator system comprising:
    a primary actuator mounted on said rigid arm assembly at a first location;
    at least one mode-canceling actuator attached to said rigid arm assembly at a selective location wherein said selective location is determined by empirical or analytic techniques such that the strain in said at least one mode-canceling actuator is in phase with sway deformations of said primary actuator produced by said vibrational modes;
    a primary driving means directly connected to said primary actuator for causing said primary actuator to exert a primary force, $$\check{f}_{pm},$$

on said rigid arm assembly;
    a secondary driving means directly connects to said primary driving means and to said at least one mode-canceling actuator for causing said at least one mode-canceling actuator to exert a mode-canceling force, $$\check{f}_{mc},$$

on said rigid arm assembly such that at least one of said vibrational modes is canceled while preserving rigid body motion characteristics of said rigid arm assembly; and
    a control means for setting a ratio r between said primary force $$\check{f}_{pm}$$

and said mode-canceling force $$\check{f}_{mc},$$

wherein the value of said ratio r and said selective location are determined such that none of said vibrational modes produced by said mode-canceling force exceeds any corresponding vibrational modes caused by said primary actuator by more than 6 dB.

2. The actuator system of claim 1, wherein said at least one vibrational mode is the butterfly mode.

3. The actuator system of claim 1, wherein said predetermined vibrational modes are major vibrational modes.

4. The actuator system of claim 1, wherein said primary actuator is a voice coil motor.

5. The actuator system of claim 4, wherein said at least one mode-canceling actuator is a piezoelectric actuator.

6. The actuator system of claim 1, wherein said at least one mode-canceling actuator is a piezoelectric actuator.

7. The actuator system of claim 1, wherein said sway deformation is contained in a plane of said rigid arm assembly.

8. The actuator system of claim 1, wherein said mode-canceling force, $$\check{f}_{mc},$$

additionally cancels at least one other vibrational mode while preserving rigid body motion characteristics of said rigid arm assembly, wherein said cancelled vibrational modes are major vibrational modes.

9. A vibrational mode canceling mechanism for stabilizing a servo-controlled actuator system deployed in a disk drive having an arm assembly, wherein said vibrational mode canceling mechanism is capable of canceling amplitude and phase effects of at least one of a plurality of vibrational modes experienced by said arm assembly while minimizing the mass of said arm assembly and preserving rigid body motion characteristics of said arm assembly, and wherein said arm assembly has a primary actuator, said vibrational mode canceling mechanism comprising:
    determining, by empirical or analytic techniques an exact position for attaching onto said arm assembly a mode-canceling actuator such that the strain in said mode-canceling actuator is in phase with sway deformations of said primary actuator produced by said vibrational modes;
    generating a primary driving signal for causing said primary actuator to exert a primary force, $$\check{f}_{pm},$$

on said arm assembly;
    in response to said primary driving signal, generating a secondary driving signal for causing said mode-canceling actuator to exert a mode-canceling force, $$\check{f}_{mc},$$

on said arm assembly such that said at least one vibrational mode is canceled, said vibrational mode mechanism further including controlling a ratio r between said primary force $$\check{f}_{pm}$$

and said mode-canceling force $$\check{f}_{mc},$$

wherein the value of said ratio r and said exact location are determined such that none of said vibrational modes produced by said mode-canceling force exceeds any of the corresponding vibrational modes caused by said primary actuator by more than 6 dB.

10. The vibrational mode canceling mechanism of claim 9, wherein said cancelled vibrational mode is the butterfly mode.

11. The vibrational mode canceling mechanism of claim 9, wherein said mode-canceling force, $$\check{f}_{mc},$$

additionally cancels at least one other vibrational mode while preserving rigid body motion characteristics of said rigid arm assembly, wherein said cancelled vibrational modes are major vibrational modes.

12. The vibrational mode canceling mechanism of claim 9, wherein said primary actuator is a voice coil motor and said mode-canceling actuator is a piezoelectric actuator.

13. The vibrational mode canceling mechanism of claim 9, wherein said sway deformation is contained in a plane of said rigid arm assembly.

14. The vibrational mode canceling mechanism of claim 9, further comprising:

determining exact locations for attaching onto said arm assembly additional mode-canceling actuators such that all mode-canceling actuators work in concert to selectively cancel one of said vibrational modes or to cancel a selective number of vibrational modes at the same time.

* * * * *